(12) United States Patent
Kikuchi

(10) Patent No.: US 9,785,636 B2
(45) Date of Patent: Oct. 10, 2017

(54) DOCUMENT MANAGEMENT METHOD AND DESIGN DOCUMENT MANAGEMENT APPARATUS

(71) Applicant: FUJITSU LIMITED, Kawasaki-shi, Kanagawa (JP)

(72) Inventor: Hideharu Kikuchi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 325 days.

(21) Appl. No.: 14/600,975

(22) Filed: Jan. 20, 2015

(65) Prior Publication Data

US 2015/0213013 A1    Jul. 30, 2015

(30) Foreign Application Priority Data

Jan. 24, 2014    (JP) .................................. 2014-011183

(51) Int. Cl.
*G06F 17/30*    (2006.01)

(52) U.S. Cl.
CPC .. *G06F 17/30011* (2013.01); *G06F 17/30424* (2013.01)

(58) Field of Classification Search
CPC ................ G06F 17/30424; G06F 17/30011
(Continued)

(56) References Cited

U.S. PATENT DOCUMENTS

| 5,323,311 A | * | 6/1994 | Fukao | .................... G06F 17/289 704/2 |
| 5,430,873 A | * | 7/1995 | Abe | .......................... G06F 8/20 707/999.102 |

(Continued)

FOREIGN PATENT DOCUMENTS

| CN | 101388018 A | * | 3/2009 | ............ G06F 17/30 |
| JP | 9-269953 | | 10/1997 | |

(Continued)

OTHER PUBLICATIONS

Baltes et al., "Linking Sketches and Diagrams to Source Code Artifacts", In Proceedings of the 22nd ACM SIGSOFT International Symposium on Foundations of Software Engineering, (FSE-22), Hong Kong, China, Nov. 16-22, 2014, pp. 743-746.*

(Continued)

*Primary Examiner* — Phuong Thao Cao
(74) *Attorney, Agent, or Firm* — Staas & Halsey LLP

(57) ABSTRACT

A non-transitory, computer-readable recording medium having stored therein a program for causing a computer to execute a process includes: specifying a relevance between machine part documents which include design information of machine parts, and specifying a keyword of each of the machine part documents; specifying a relevance between electronic part documents which include design information of electronic parts which control the machine parts, and specifying a keyword of each of the electronic part documents; specifying a relevance between program documents which include operations of programs causing the electronic parts to perform a processing, and specifying a keyword of each of the program documents; and associating documents having a common keyword among the specified keywords of the program documents, the electronic part documents, and of the machine part documents so that the program documents, the electronic part documents, and the machine part document are associated with each other, respectively.

11 Claims, 13 Drawing Sheets

(58) Field of Classification Search
USPC .......................................................... 707/769
See application file for complete search history.

(56) References Cited

U.S. PATENT DOCUMENTS

| | | | | |
|---|---|---|---|---|
| 6,295,513 | B1* | 9/2001 | Thackston | G05B 19/4099 703/1 |
| 6,499,040 | B1* | 12/2002 | Vu | G06F 17/243 707/999.104 |
| 6,625,335 | B1* | 9/2003 | Kanai | G06F 17/30259 382/177 |
| 7,003,442 | B1* | 2/2006 | Tsuda | G06F 17/30011 704/1 |
| 8,788,469 | B2* | 7/2014 | Ouchi | G06Q 10/06 707/694 |
| 8,843,494 | B1* | 9/2014 | Sampson | G06K 9/00463 707/737 |
| 9,342,795 | B1* | 5/2016 | Poole | G06N 5/00 |
| 2001/0047402 | A1* | 11/2001 | Saimi | G06F 9/54 709/219 |
| 2002/0095418 | A1* | 7/2002 | Honda | G06F 17/30011 |
| 2002/0120612 | A1* | 8/2002 | Ichihara | G06F 17/30011 |
| 2003/0009478 | A1 | 1/2003 | Furukawa et al. | |
| 2003/0156139 | A1* | 8/2003 | Kimura | G06F 17/50 715/804 |
| 2004/0107214 | A1* | 6/2004 | Hung | G06F 17/30864 |
| 2004/0117374 | A1* | 6/2004 | Hung | G06F 17/30864 |
| 2005/0188306 | A1* | 8/2005 | Mackenzie | G06F 17/30011 715/268 |
| 2006/0293939 | A1* | 12/2006 | Sun | G06Q 10/06 705/7.14 |
| 2007/0130561 | A1* | 6/2007 | Siddaramappa | G06F 8/10 717/106 |
| 2007/0130627 | A1* | 6/2007 | Yoshioka | G06F 21/645 726/27 |
| 2007/0244921 | A1* | 10/2007 | Blair | G06F 17/30011 |
| 2008/0222168 | A1* | 9/2008 | Morales | G06F 17/30657 |
| 2008/0301010 | A1* | 12/2008 | Klim | G06Q 10/08 705/28 |
| 2009/0083200 | A1* | 3/2009 | Pollara | G06N 99/005 706/14 |
| 2009/0138461 | A1* | 5/2009 | Bhide | G06F 17/30684 |
| 2009/0198680 | A1* | 8/2009 | Kashioka | G06F 17/30011 |
| 2009/0254877 | A1* | 10/2009 | Kuriakose | G06F 8/36 717/105 |
| 2010/0079781 | A1* | 4/2010 | Yamamoto | H04N 1/2179 358/1.13 |
| 2010/0082709 | A1* | 4/2010 | Yamamoto | G06F 17/30011 707/812 |
| 2010/0114561 | A1* | 5/2010 | Yasin | G06F 17/3071 704/9 |
| 2010/0293524 | A1* | 11/2010 | Ahadian | G06F 8/10 717/109 |
| 2011/0191739 | A1 | 8/2011 | Hasegawa et al. | |
| 2013/0086556 | A1* | 4/2013 | Grechanik | G06F 11/3684 717/126 |
| 2013/0124507 | A1* | 5/2013 | Gartland | G06F 17/30867 707/723 |
| 2013/0204890 | A1* | 8/2013 | Kamekawa | G06F 17/30011 707/758 |
| 2014/0033069 | A1* | 1/2014 | Chegini | G06Q 10/10 715/751 |
| 2014/0188850 | A1* | 7/2014 | Hanamoto | G06F 17/30103 707/722 |
| 2014/0282356 | A1* | 9/2014 | Mills | G06F 17/30958 717/101 |
| 2015/0039985 | A1* | 2/2015 | Hara | G06F 17/245 715/212 |
| 2015/0134641 | A1* | 5/2015 | Yokoyama | G06F 17/30011 707/722 |
| 2015/0213013 | A1* | 7/2015 | Kikuchi | G06F 17/30424 707/769 |
| 2015/0356206 | A1* | 12/2015 | Nalluri | G06F 17/50 703/1 |
| 2016/0004714 | A1* | 1/2016 | Szymkowiak | G06F 17/30067 715/739 |

FOREIGN PATENT DOCUMENTS

| | | | | |
|---|---|---|---|---|
| JP | 2002157120 A | * | 5/2002 | ............... G06F 9/44 |
| JP | 2003-22294 | | 1/2003 | |
| JP | 2008-287300 | | 11/2008 | |
| JP | 2010-9314 | | 1/2010 | |
| WO | WO 2010/038387 A1 | | 4/2010 | |

OTHER PUBLICATIONS

Chen et al., "Software Traceability Establishment Revolution Based on Complexity Science", In Proceedings of the International Conference on Software Engineering Research and Practice (SERP), 2012, 6 pages.*

Marcus et al., "Recovery of Traceabillity Links between Software Documentation and Source Code", International Journal of Software Engineering and Knowledge Engineering, vol. 15, No. 4, pp. 811-836, 2005.*

Hou et al., "An Intelligent Knowledge Management Model for Construction and Reuse of Automobile Manufacturing Intellectual Properties", The International Journal of Advanced Manufacturing Technology, Jul. 2005, vol. 26, Issue 1, pp. 169-182.*

Yamada et al., "A Support System for Helping to Understand a Project in Software Maintenance Using the Program Package Name", In Proceedings of the 2013 IEEE/ACIS 12th International Conference on Computer and Information Science (ICIS), pp. 411-416, 2013.*

* cited by examiner

DOCUMENT MANAGEMENT METHOD AND DESIGN DOCUMENT MANAGEMENT APPARATUS

CROSS-REFERENCE TO RELATED APPLICATION

This application is based upon and claims the benefit of priority from the prior Japanese Patent Application No. 2014-011183 filed on Jan. 24, 2014, the entire contents of which are incorporated herein by reference.

FIELD

The embodiments discussed herein are related to a design document management method and a design document management apparatus.

BACKGROUND

For example, a control system includes machine parts, electronic parts that control the machine parts, and a program that executes a processing of the electronic parts. When such a control system is developed, each of the design documents of the machinery parts, the electronic parts, or the program is managed as electronic data.

As a related technique, there is proposed a technique which associates an input port with an output port so as to connect a plurality of modules to each other based on port information and instance information. There is also proposed a technique which, when a number of fixed elements actually provided in a part does not coincide with a number of fixed elements be provided in the part, displays information to that effect.

There is proposed a technique regarding a logic diagram entry device which schematically displays a plurality of drawings on one screen according to contents described in a connection drawing file between created drawings. There is proposed a technique which extracts a shape change portion of an equipment 3D-model, stores the shape change portion as new dimension and arrangement parameters in the equipment 3D-model to be reused as a new equipment 3D-model. There is proposed a technique which manages relevance data between drawings with editing flag data and other drawing objects as a drawing object.

Related techniques are disclosed in, for example, International Publication Pamphlet No. WO2010/038387, Japanese Laid-Open Patent Publication No. 2010-009314, Japanese Laid-Open Patent Publication No. 2003-022294, Japanese Laid-Open Patent Publication No. 2008-287300 and Japanese Laid-Open Patent Publication No. H09-0269953.

A system which designs the machine parts, a system which designs the electronic parts, and a system which designs the program are different from each other. Accordingly, electronic data for individual design documents are independently managed by different systems.

In the control system, the machine parts, the electronic parts, and the program have a relevance each other. Therefore, when any one of the design documents is changed, this may affect the other design documents in some cases. For example, when a design of the program is changed, the design documents of the machine parts or the electronic parts may be affected by the change.

To this end, the design document of the machine parts, the design document of the electronic parts, and the design document of the program are managed by different systems. Therefore, when a design document which is managed by any one of the system is changed, it is difficult to specify a design document of another system affected by the change. A verifying operation for specifying the design document of the other system affected by the change may be complicated.

SUMMARY

According to an aspect of the embodiments, a non-transitory, computer-readable recording medium having stored therein a program for causing a computer to execute a process includes: specifying a relevance between machine part documents which include design information of machine parts, and specifying a keyword of each of the machine part documents; specifying a relevance between electronic part documents which include design information of electronic parts which control the machine parts, and specifying a keyword of each of the electronic part documents; specifying a relevance between program documents which include operations of programs causing the electronic parts to perform a processing, and specifying a keyword of each of the program documents; and associating documents having a common keyword among the specified keywords of the program documents, the electronic part documents, and of the machine part documents so that the program documents, the electronic part documents, and the machine part document are associated with each other, respectively.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

<Exemplary System Configuration>

Hereinafter, embodiments will be described with reference to drawings. According to an embodiment, management of electronic data of three kinds of design documents for machine parts, electronic parts, and programs is supported. Hereinafter, electronic data of a design document may be also referred to as document data. Further, the design document of the machine parts, the design document of the electronic parts, and the design document of the programs may be also referred to as a machine part document, an electronic part document, and a program document, respectively.

The design document of the machine parts refers to document data which describes design information of the machine parts. The design document of the electronic parts refers to document data which describes design information of the electronic parts. The design document of the program refers to document data which describes design information of the program. The document data may also be referred to as a product.

Design information which controls the machine parts or design information which allows the electronic parts to execute a predetermined processing may be described in the design document of the program. Design information which controls the machine parts may be described in the design document of the electronic parts.

In the embodiment, three kinds of document data for the machine parts, the electronic parts, and the program are taken as objects to be managed. However, at least the document data of the machine parts and the document data of the program may be managed.

Figure 1:
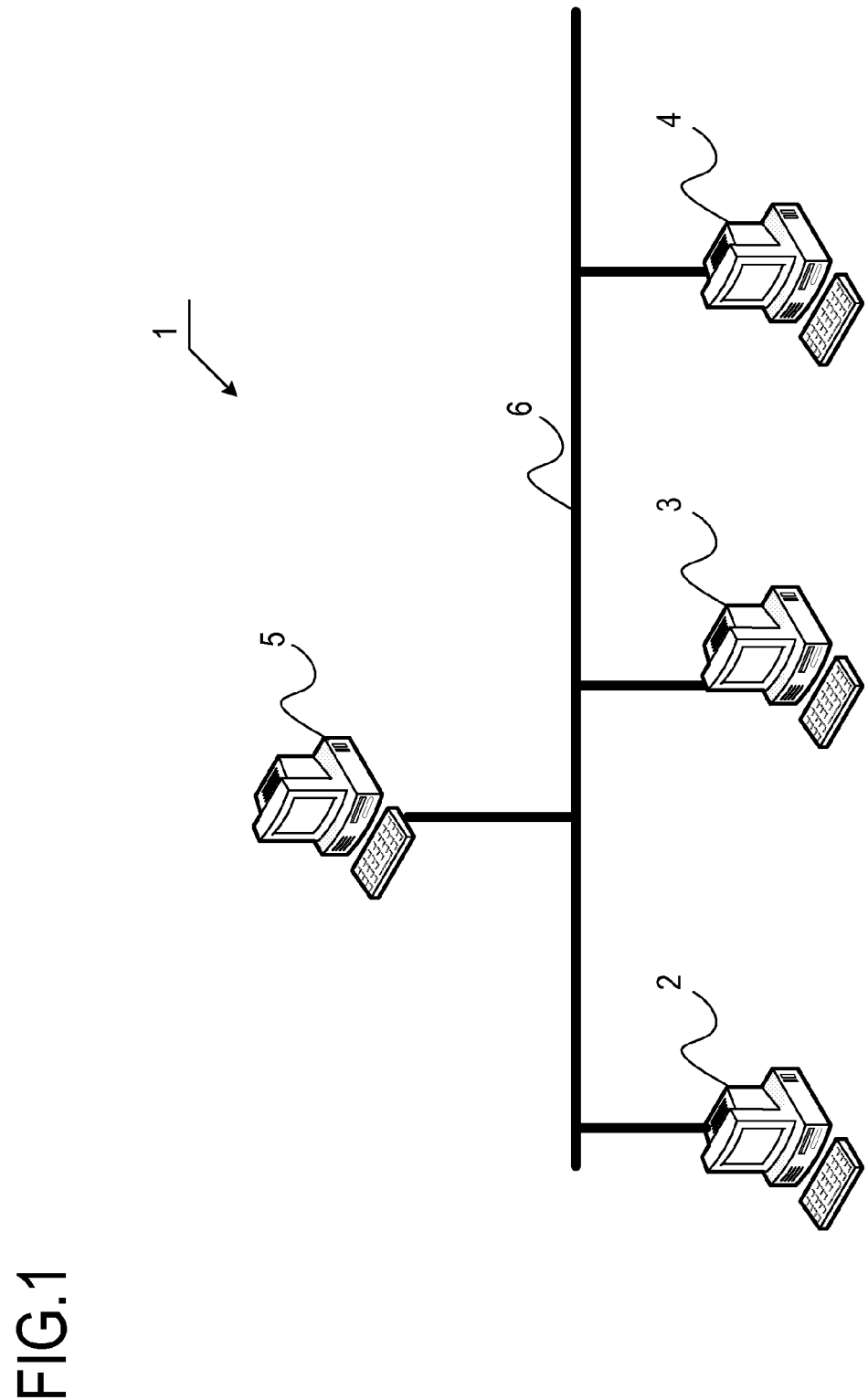
FIG. 1 is a diagram illustrating an exemplary overall configuration of a system.

FIG. 1 illustrates an exemplary system 1 which performs management supporting of a design document. The system 1 includes a program document management computer 2, an electronic part document management computer 3, a machine part document management computer 4, and a design document management supporting computer 5. The program document management computer 2, the electronic part document management computer 3, the machine part document management computer 4, and the design document management supporting computer 5 are connected to each other through a local area network (LAN) 6.

The program document management computer 2 manages a program document. The electronic part document management computer 3 manages an electronic part document. The machine part document management computer 4 manages a machine part document. As illustrated in the example of FIG. 1, the program document, the electronic part document, and the machine part document are managed by different computers, respectively.

When a program is designed, the program document management computer 2 is used. When an electronic part is designed, the electronic part document management computer 3 is used. When a machine part is designed, the machine part document management computer 4 is used. The program document management computer 2, the electronic part document management computer 3, and the machine part document management computer 4 are different from each other.

The design document management supporting computer 5 acquires various document data from the program document management computer 2, the electronic part document management computer 3, and the machine part document management computer 4. The design document management supporting computer 5 manages the acquired various document data to be associated with each other. The design document management supporting computer 5 is an exemplary design document management supporting apparatus.

<Exemplary Document Data>

Next, exemplary document data will be described. At first, a program document will be described. The program document refers to a program design document and may include a technology which controls a machine part or a technology which allows an electronic part to execute a predetermined processing. Hereinafter, the program document may also be referred to as a source code. The source code includes a plurality of functions. The functions include, for example, a class, a method, and a member.

For example, a class so-called "public class DoBraking" defines contents of a processing so-called "DoBraking". Further, since the class is a "public class", the class is an open class. Therefore, other source code may also call for the class "public class DoBraking".

According to the embodiment, it is assumed that a keyword is defined in a function name or a comment. In the case of the above-mentioned class of "public class DoBraking", the keyword is "Braking". In this case, the keyword is defined in the class name.

Further, in a class of "public class FIleToString//Braking", "Braking" is defined in a comment part ("//" part). Therefore, the keyword is "Braking". The above keywords are defined when a source code is created. When a keyword is defined in a function, the keyword may be defined not only in the class but also in a method or a member, for example.

Next, document data of an electronic part (hereinafter, referred to "electronic part document data") will be described. The electronic part controls an operation of a machine part. According to an embodiment, the electronic part document data is, for example, circuit design data. The circuit design data may be created using a computer aided design (CAD) for creating a circuit.

The circuit design data includes various circuit information items which implement a function of an electronic part. The circuit design data has an attribute. The attribute includes a keyword. For example, a keyword "Braking" may be defined in the attribute of the circuit design data of an electric control unit (ECU) which is an electronic part controlling a machine part.

Next, document data of a machine part (hereinafter, referred to as "machinery part document data") will be described. In the example illustrated in FIG. 2, two machine parts including part A and part B are illustrated. Part A and part B are different machine parts and the machinery part document management computer 4 manages part A and part B as different machine parts.

Figure 2:
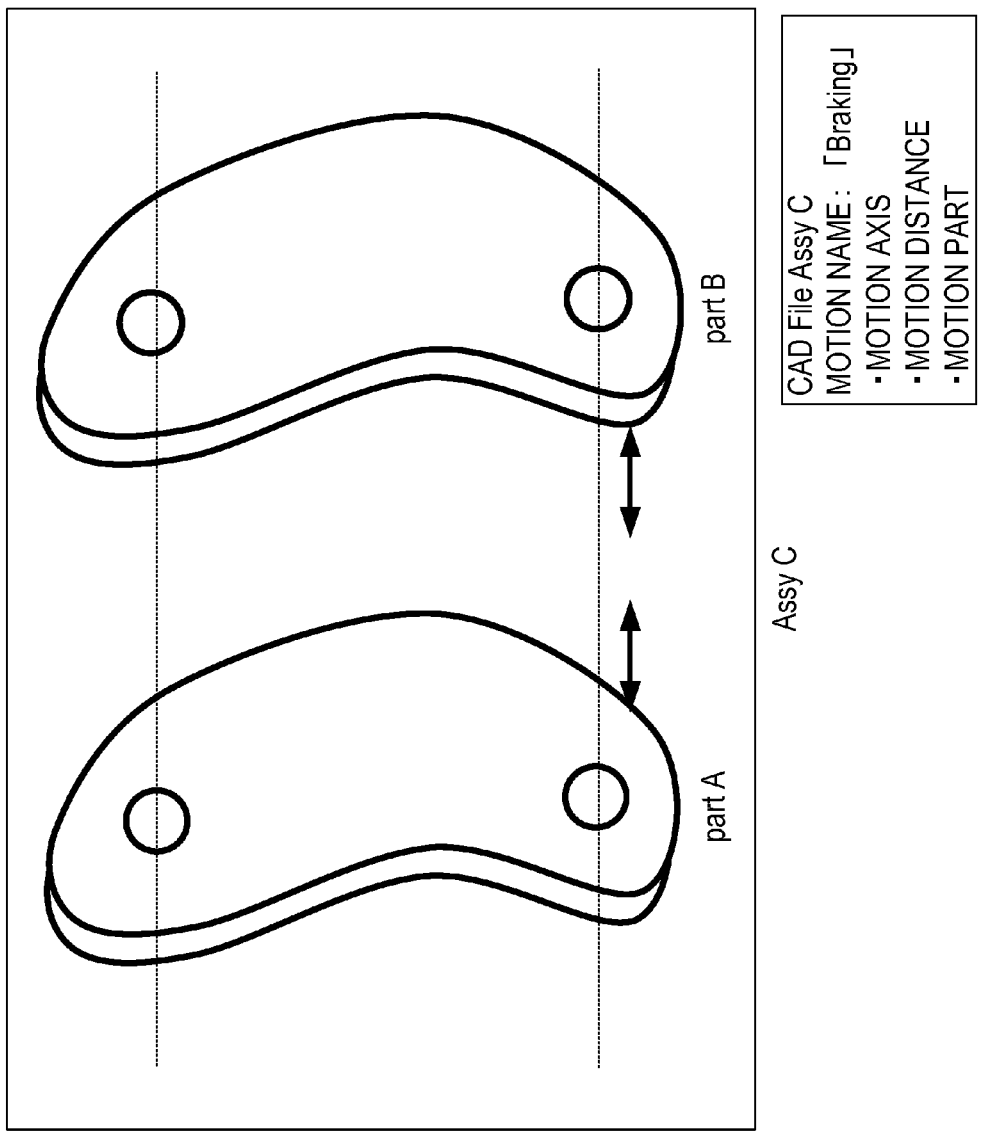
FIG. 2 is a view illustrating an exemplary relevance between two machine parts.

FIG. 2 illustrates a relevance between part A and part B. Assembly C (Assy C) is illustrated in a state which it includes part A and part B. Part A and part B may move in a mutually separating or approaching direction (directions indicated by arrows in FIG. 2).

Further, each of part A and part B has two through holes. The through holes of part A and the through holes of part B are linearly disposed. In the example illustrated in FIG. 2, when shaft member is inserted through part A and part B, part A and part B may move in the arrow directions indicated by the arrows in FIG. 2.

Part A and part B are included in a machine part document. According to the embodiment, it is assumed that the machine part document is CAD data. Hereinafter, the CAD data may also be referred to as a model. Therefore, the machine part document management computer 4 manages a model of part A and a model of part B. In the example of FIG. 2, there is a relevance between the model of part A and model of the part B. For example, when part A and part B are in contact with each other, there is a relevance therebetween.

It is assumed that there are a plate member (a machine part) having a screw hole and a screw (a machine part), as an example of relevance between machine parts. When the features of the screw hole of the plate member and the screw are equal to each other, the plate member having the screw hole and the screw have the relevance. In addition, when the machine parts are integrally connected to each other by, for example, fitting or welding, the machine parts have the relevance. Further, when one machine part is operated in cooperation with another machine part (e.g., kinematics), the machine parts have the relevance.

An exemplary attribute of the CAD data is illustrated in FIG. 2. A file name of the CAD data is "CAD File Assy C". The attribute of the CAD data includes a keyword. In the example of FIG. 2, a motion name "Braking" is defined as a keyword. The keyword is also defined in the attribute of the machine part document of part A and part B.

"MOTION AXIS" in the attribute of FIG. 2 indicates an axis of the above-mentioned shaft member. Further, "MOTION DISTANCE" indicates a moving distance of part A and part B. Further, "MOTION PART" indicates part A and part B.

<Exemplary Design Document Management Supporting Unit>

Figure 3:
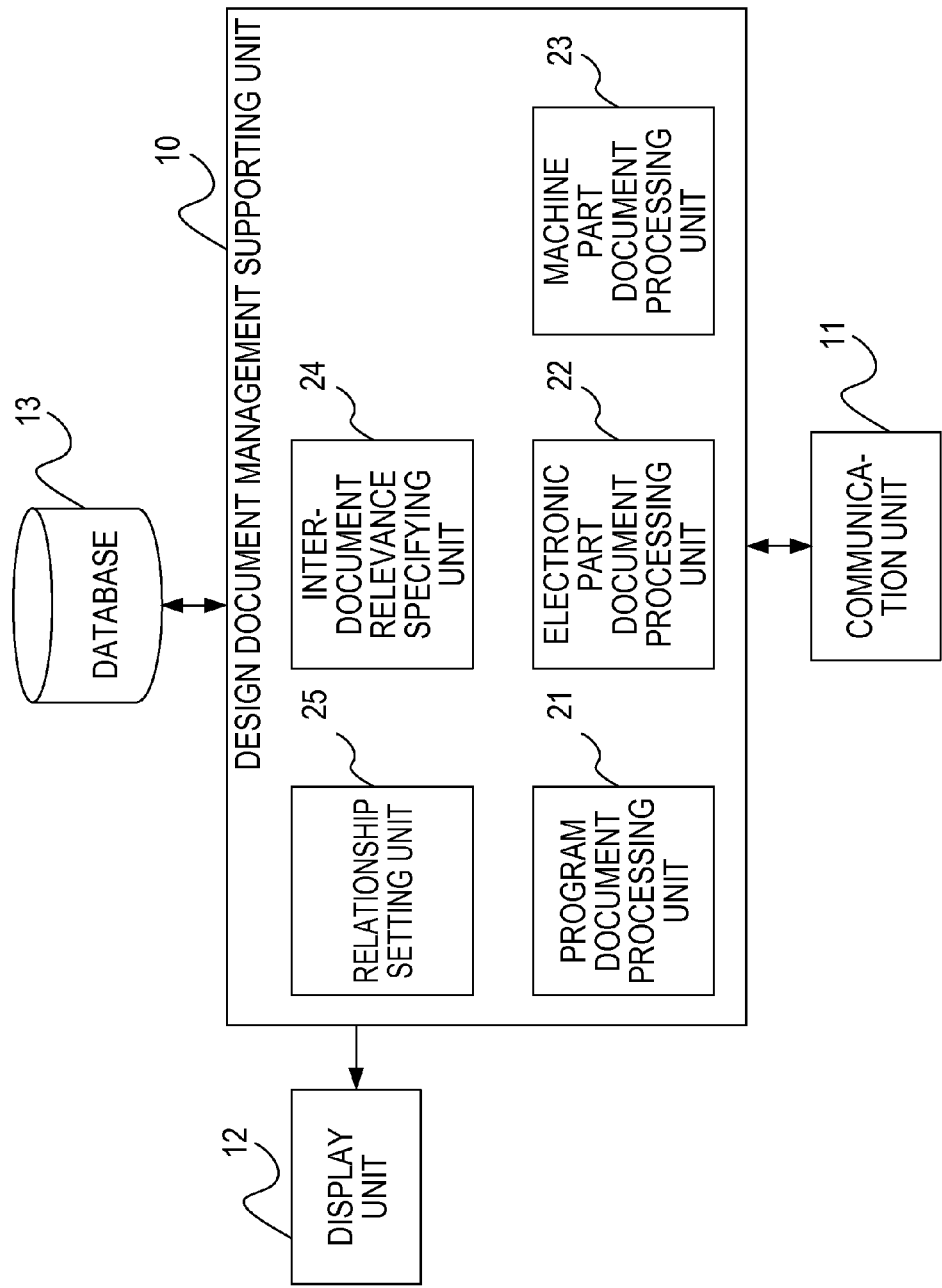
FIG. 3 is a block diagram illustrating an exemplary design document management supporting unit.

Next, an exemplary design document management supporting unit will be described with reference to FIG. 3. FIG. 3 illustrates a design document management supporting unit 10 as an example which is installed in a design document management supporting computer 5. The design document management supporting unit 10 is connected to a communication unit 11, a display unit 12, and a database 13. A function of the design document management supporting unit 10 may be implemented by software.

The communication unit 11 is an interface which communicates with a bus 6 of FIG. 1. The design document management supporting unit 10 communicates with the program document management computer 2, the electronic part document management computer 3, and the machine part document management computer 4 through the communication unit 11 so as to acquire information. The display unit 12 displays a screen output from the design document management supporting unit 10. The database 13 stores key words and document data to be associated with each other.

The design document management supporting unit 10 is provided in a design document management supporting equipment. The design document management supporting unit 10 includes a program document processing unit 21, an electronic part document processing unit 22, a machine part document processing unit 23, an inter-document relevance specifying unit 24, and a relationship setting unit 25.

The machine part document processing unit 23 is an example of a first specifying unit. The electronic part document processing unit 22 is an example of a second specifying unit. The program document processing unit 21 is an example of a third specifying unit. The inter-document relevance processing unit 24 is an example of a fourth specifying unit.

The program document processing unit 21 processes a program document which is stored in the program document management computer 2. The program document processing unit 21 acquires all source codes which are stored in the program document management computer 2 through the communication unit 11 and the LAN 6. The acquired source codes are source codes for the design document. The program document processing unit 21 extracts a keyword from all functions which are included in the source codes.

The program document processing unit 21 specifies a keyword which is defined in the machine part document and a keyword which is defined in the attribute of the electronic part, among the extracted keywords. For example, the above-described "Braking" is a keyword to control the machine part and a keyword to allow the electronic part to execute a predetermined processing. Therefore, when the program document processing unit 21 extracts the keyword "Braking" from the function of the source code, the program document processing unit 21 specifies that the key word is defined in an attribute of the CAD data of the machine part and an attribute of the circuit design data of the electronic part.

The program document processing unit 21 stores the extracted keyword and a source code including the keyword in the database 13 to be associated with each other. In this case, the program document processing unit 21 may store the keyword and information specifying the source in the database 13 to be associated with each other.

For example, the information specifying the source code may be a file name of the source code or a value which is applied to the source code. Information specifying the source code may be any information as long as it may uniquely specify the source code. In the meantime, the source code itself may be associated with the keyword to be stored in the database 13.

The electronic part document processing unit 22 processes the electronic part document which is stored in the electronic part document management computer 3. The electronic document processing unit 22 acquires all circuit design data which are stored in the electronic part document management computer 3 through the communication unit 11 and the LAN 6. The acquired circuit design data is related to a design document. The electronic part document processing unit 22 extracts a keyword included in the attribute of all circuit design data.

The electronic part document processing unit 22 specifies a keyword which is defined in the attribute included the circuit design data of the electronic part which controls the machine part. When the electronic part document processing unit 22 extracts the keyword, the electronic part document processing unit 22 specifies that the keyword is a keyword which is defined in the attribute of the circuit design data of the electronic part which controls the machine part.

The electronic part document processing unit 22 associates a specific keyword with the circuit design data. The electronic part document processing unit 22 stores the information specifying the circuit design data and a keyword in the database 13 to be associated with each other. The information specifying the circuit design data may include, for example, a file name of the circuit design data and a value given to the circuit design data.

The machine part document processing unit 23 processes the machine part document which is stored in the machine part document management computer 4. The machine part document processing unit 23 acquires all CAD data which are stored in the machine part document management computer 4 through the communication unit 11 and the LAN 6. The acquired CAD data is data for a design document. The machine part document processing unit 23 extracts a keyword included in the attribute of all CAD data.

The machine part document processing unit 23 associates the extracted keyword with the CAD data. The machine part document processing unit 23 stores the information specifying the keyword and the CAD data in the database 13 to be associated with each other. The information specifying the CAD data is a file name of the CAD data or a value given to the CAD data.

The inter-document relevance specifying unit 24 specifies a relevance among the machine part document, the electronic part document, and the program document. As described above, in the database 13, a keyword and the information specifying the source code are stored to be associated with each other. Further, in the database 13, a keyword and the information specifying the circuit design data are stored to be associated with each other. Further, in the database 13, a keyword and the information specifying the CAD data are stored to be associated with each other.

The inter-document relevance specifying unit 24 extracts a keyword from the database 13 and associates the program document, the machine part document, and the electronic part document with each other based on the extracted keyword. That is, the inter-document relevance specifying unit 24 associates the source code, the circuit design data, and the model which have the same keyword. Accordingly, the inter-document relevance specifying unit 24 associates the program document, the machine part document, and the electronic part document with each other.

The relationship setting unit 25 sets a relationship to document data which has a relevance between the same kind of documents or between different kinds of documents. The relevance between the same kind of documents includes relevance programs. For example, when a function of any source code calls for another source code, there is a relevance between programs. Therefore, the relationship setting unit 25 sets a relationship between the programs having the relevance.

In addition, the relevance between the same kind of documents includes a relevance between electronic part documents. For example, when a circuit of one circuit design data is electrically connected with a circuit of another circuit design data, there is a relevance between the electronic part documents. Therefore, the relationship setting unit 25 sets a relationship between electronic part documents having relevance.

In addition, the relevance between the same kind of documents includes relevance between machine part documents. For example, when there is a relevance as described above between one model and the other model, there is a relevance between the machine part documents. Therefore, the relationship setting unit 25 sets a relationship between machine part documents having relevance.

The program document, the electronic part document, and the machine part document are different kinds of document data. According to the embodiment, the inter-document relevance specifying unit 24 associates document data of the different kinds based on the keyword. The relationship setting unit 25 sets a relationship among the program document, the electronic part document, and the machine part document which are associated by the inter-document relevance specifying unit 24.

According to the embodiment, the design document management supporting unit 10 creates a screen which visualizes relationship information set by the relationship setting unit 25. The design document management supporting unit 10 controls the display unit 12 to display the visualized screen. Therefore, the relationship between the same kind of documents or between different kinds of documents is displayed on the display unit 12.

Exemplary Processing of Embodiment

Next, an exemplary processing of an embodiment will be described with reference to FIGS. 4 to 7. Hereinafter, it is assumed that the program document management computer 2 stores six programs including source codes A to F. However, the number of programs which are stored in the program document management computer 2 is not limited to six.

Further, it is assumed that the electronic part document management computer 3 stores circuit design data of ECU-A and ECU-F. However, the number of circuit design data stored in the electronic part document management computer 3 is not limited to two.

Further, it is considered that the machine part document management computer 4 stores six models of models A to F. However, the number of programs stored in the machine part document management computer 4 is not limited to six. Source codes A to F, ECU-A and ECU-B, the circuit design data, and models A to F are examples of products.

Figure 4:
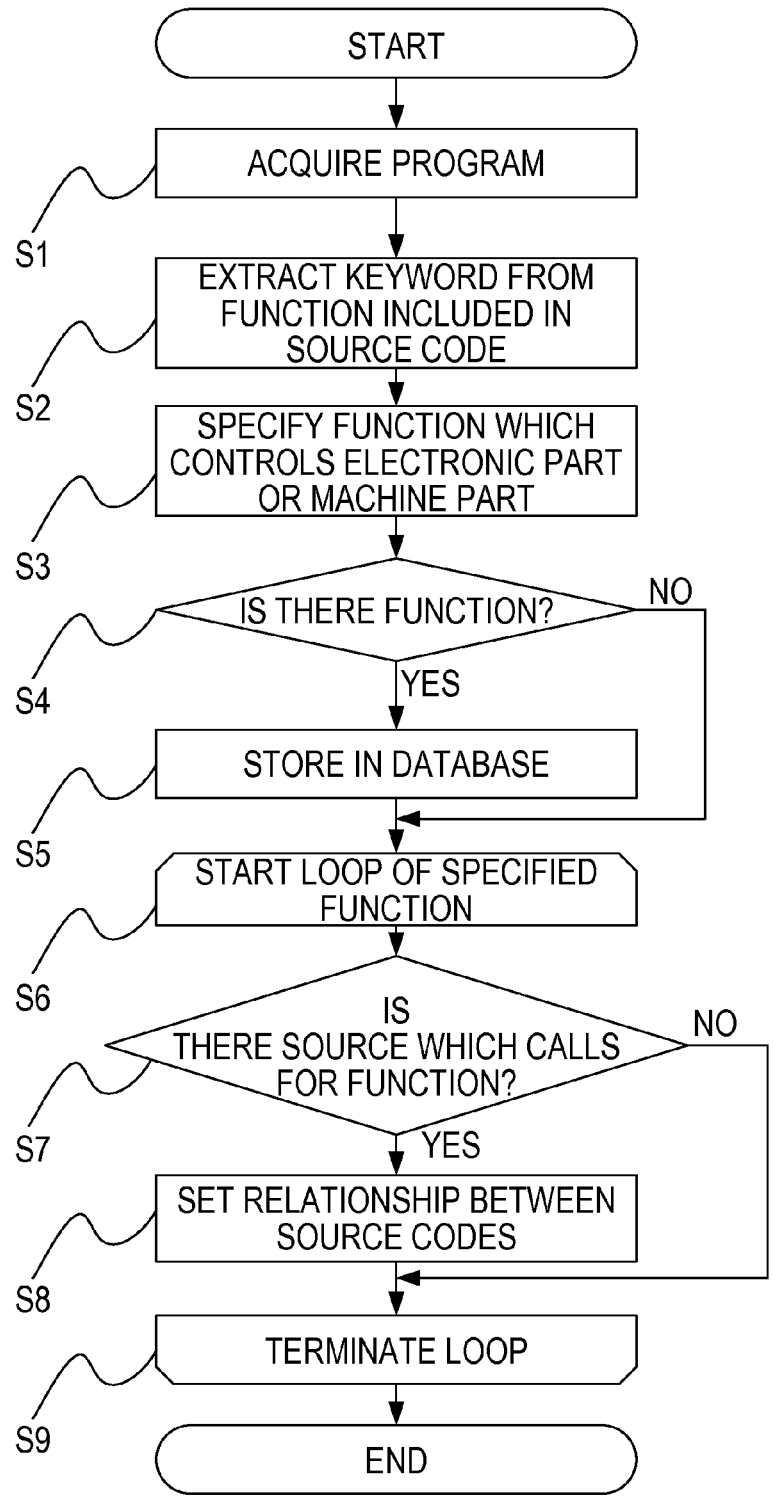
FIG. 4 is a flowchart illustrating an exemplary processing for a program document.
Figure 5:
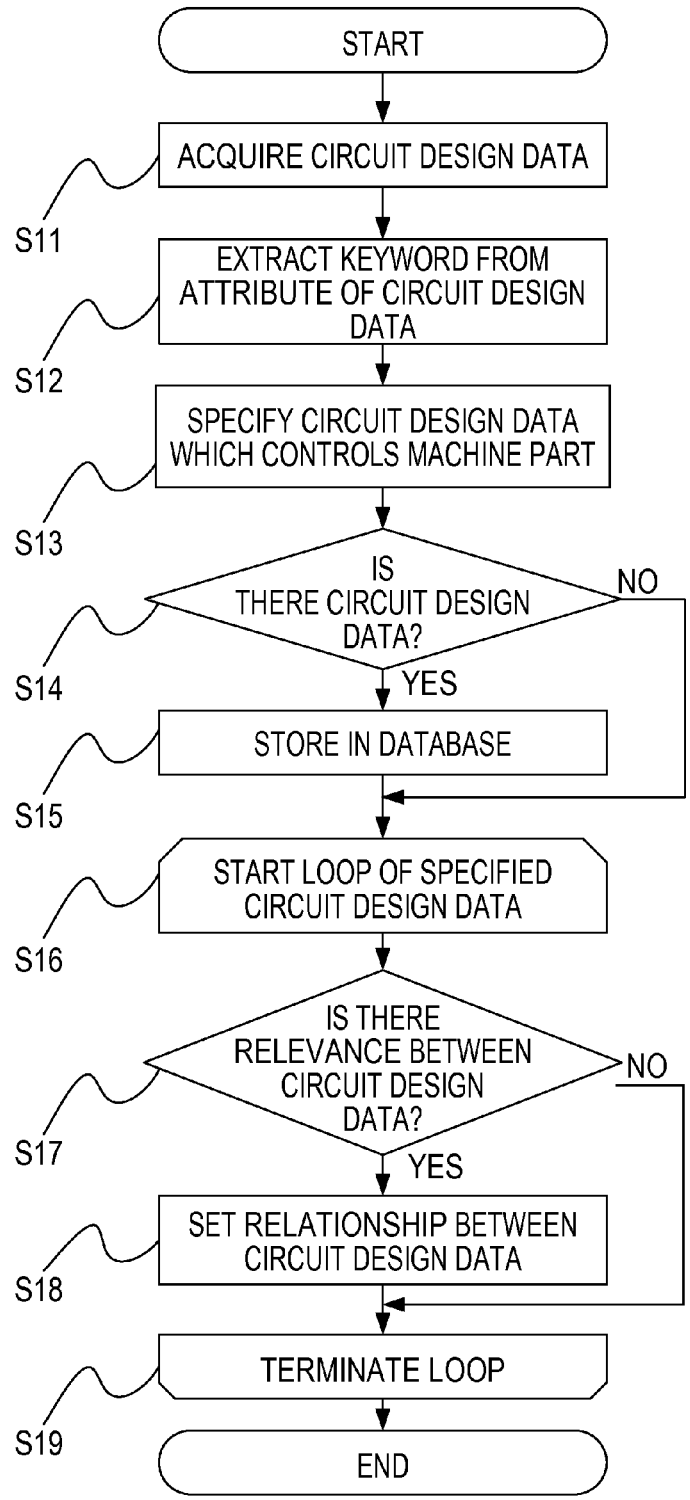
FIG. 5 is a flowchart illustrating an exemplary processing for an electronic part document.
Figure 6:
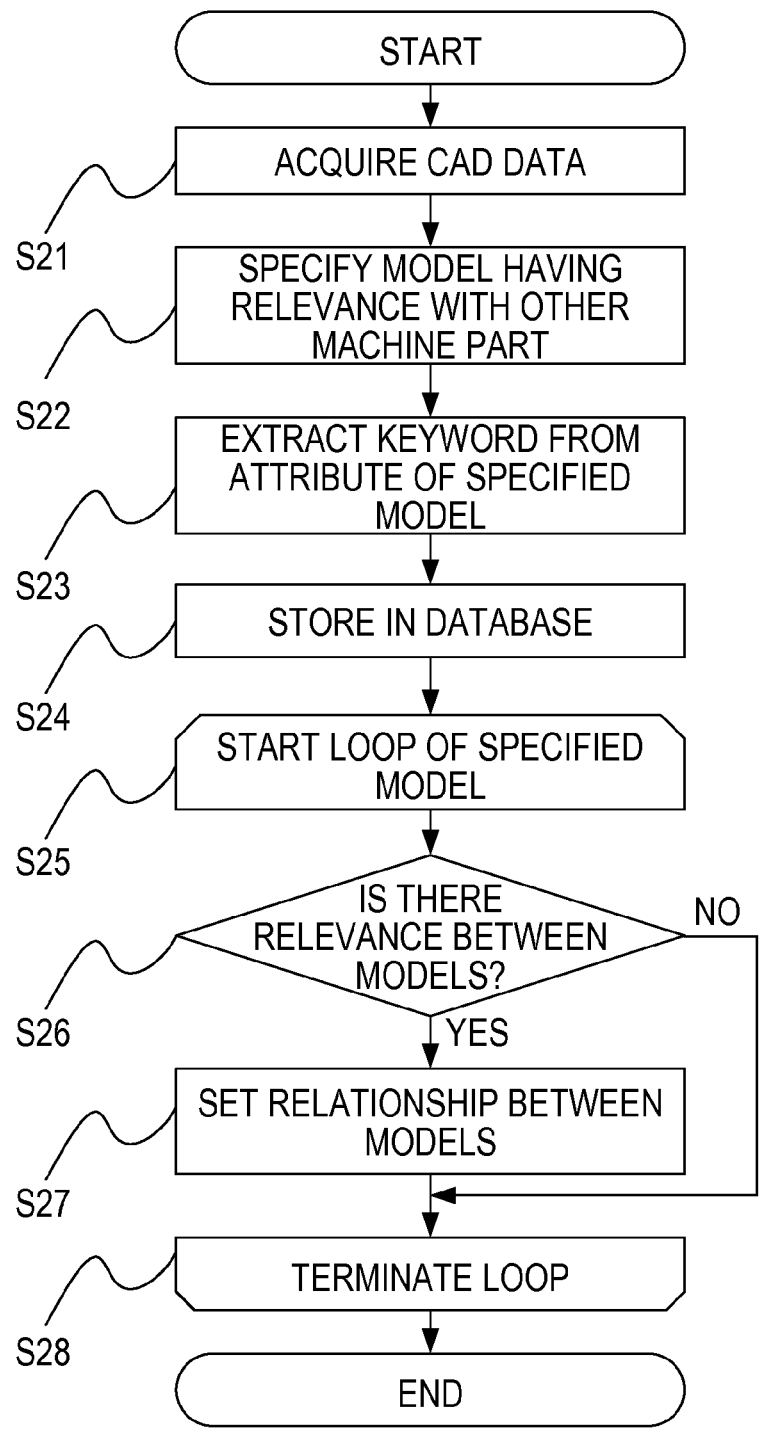
FIG. 6 is a flowchart illustrating an exemplary processing for a machine part document.
Figure 7:
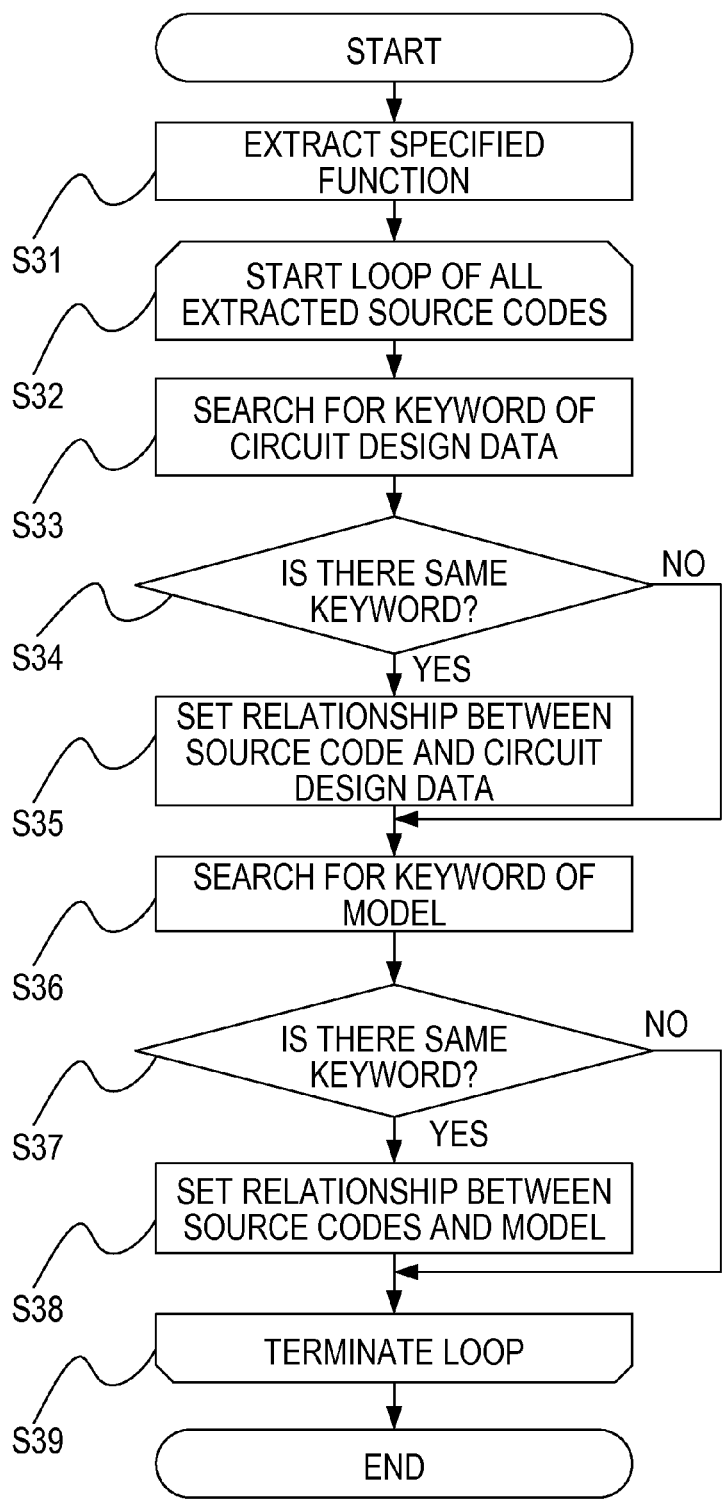
FIG. 7 is a flowchart illustrating an exemplary processing of specifying a relevance between document data.

FIG. 4 illustrates an exemplary processing on a program document. FIG. 5 illustrates an exemplary processing on an electronic part document. FIG. 6 illustrates an exemplary processing on a machine part document. Any of processings of FIGS. 4 to 6 may start first. That is, the processings of FIGS. 4 to 6 may be performed in an arbitrary order.

An exemplary processing on the program document will be described with reference to FIG. 4. The design document management supporting unit 10 accesses the program document management computer 2 through the communication unit 11 and the LAN 6 to acquire all programs which are stored in the program document management computer 2 (step S1).

As described above, for example, six program documents are stored in the program document management computer 2. Therefore, the design document management supporting unit 10 acquires six program documents for source codes A to F. The program document processing unit 21 processes the acquired six program documents.

The program document processing unit 21 extracts a keyword which is defined in a function included in a source code, in relation to each of source codes A to F (step S2). As described above, the program document processing unit 21 extracts the keyword based on a function name of a function such as, for example, a method, a class, or a member, or a comment described in the function.

The program document processing unit 21 specifies a function which controls a machine part or an electronic part, among the functions from which a keyword is extracted (step S3). According to an embodiment, it is assumed that a comment of a class included in source code A includes a definition to control model A of the machine part and electronic part ECU-A. For example, the keyword of this definition is referred to as "KEY-A".

Further, it is assumed that the class name of the class included in source code B includes a definition to control model B of the machine part. For example, the keyword of this definition is referred to as "KEY-B". Further, it is assumed that the class name of the class included in source code C includes a definition to control model C of the machine part. For example, the keyword of this definition is referred to as "KEY-C".

Further, it is assumed that the class name of the class included in source code D includes a definition to control model C of the machine part. Since this definition is the definition to control model C of the machine part, the keyword of this definition is referred to as "KEY-C". Further, it is assumed that the class name of the class included in source code E includes a definition to control model B of the machine part. Since this definition is the definition to control model B of the machine part, the keyword of this definition is referred to as "KEY-B".

Further, it is assumed that a comment of a class included in source code F includes a definition to control model F of the machine part and electronic part ECU-F. For example, the keyword of this definition is referred to as "KEY-F".

The class name included in each of the source codes or a keyword which is defined in the comment of each of the classes is set in advance. Therefore, there is no need to newly set a definition for each source code in order to perform the processing according to the embodiment.

The program document processing unit 21 determines whether there is a function specified in step S3 (step S4). When there is a function specified in step S3 (YES in step S4), the program document processing unit 21 stores information specifying a source code including the specific function and a keyword in the database 13 to be associated with each other (step S5).

Therefore, the program document processing unit 21 stores information specifying source code A and the keyword "KEY-A" in the database 13 to be associated with each other. Further, the program document processing unit 21 stores information specifying source code B and the keyword "KEY-B" in the database 13 to be associated with each other.

The program document processing unit 21 stores information specifying source code C and the keyword "KEY-C" in the database 13 to be associated with each other. The program document processing unit 21 stores information specifying source code D and the keyword "KEY-C" in the database 13 to be associated with each other.

The program document processing unit 21 stores information specifying source code E and the keyword "KEY-B" in the database 13 to be associated with each other. The program document processing unit 21 stores information specifying source code F and the keyword "KEY-F" in the database 13 to be associated with each other.

In the meantime, a function may not be specified in step S3 in some cases. Further, a function from which a key word is extracted by the program document processing unit 21 may not be a function which controls the machine part or the electronic part in some cases. In this case, the program document processing unit 21 determines that there is no specified function (NO in step S4) and the program document processing unit 21 does not perform a processing of storing information in the database 13.

The program document processing unit 21 performs a loop processing of step S7 and step S8 by the function specified in step S3 (step S6). The program document processing unit 21 determines whether there is a source code which calls for a function specified in step S3 (step S7).

For example, when there is a source code which calls for a source or a method which instantiates a class including the specified function, the determination in step S7 becomes YES. Meanwhile, when the above-mentioned source code does not exist, the determination in step S7 becomes NO.

When the program document processing unit 21 determines it as YES in step S7, a relationship setting unit 25 sets a relationship between the source code which includes the function specified in step S3 and a source code which calls for the source code (step S8).

According to the embodiment, it is assumed that the class included in source code A is called for by source code B. Further, it is assumed that a method included in source code C is called for by source code B.

As described above, in step S3, the program document processing unit 21 specifies functions which are included in source codes A to F. Among this, the functions which are included in source code A and source code C are called for by other source code. Therefore, the relationship setting unit 25 sets a relationship between source code A and source code B. Further, the relationship setting unit 25 sets a relationship between source code C and source code E.

In the meantime, there is no other source code which calls for functions included in source code D and source code F. Therefore, the relationship setting unit 25 does not set a relationship to source code D and source code F.

When the processings of steps S7 and S8 on all functions specified in step S3 are terminated, the loop processing which has started from step S6 is terminated in step S9. A relationship between the same kinds of document data is set by the loop processing from step S6 to step S9. That is, a relationship is set between source codes which call for a function.

Here, the processings of steps S6 to S9 are performed on a source code which includes a function to control the electronic part or the machine part in step S3. Therefore, the processings of steps S6 to S9 are not performed on a source code which does not include a function to control the electronic part and the machine part.

That is, when a source code is a machine part or a source code which does not control the machine part, the program document processing unit 21 performs the processings of steps S6 to S9 excluding the source code. Therefore, a source code which becomes an object on which the processings of steps S6 to S9 are performed may be narrowed down so as to speed up the processings.

An exemplary processing on an electronic part document will be described with reference to FIG. 5. The design document management supporting unit 10 accesses the electronic part document management computer 3 through the communication unit 11 and the LAN 6 to acquire all the circuit design data stored in the electronic part document management computer 3 (step S11).

The electronic part document processing unit 22 extracts a keyword from an attribute of the acquired circuit design data (step S12). According to the embodiment, it is assumed that the keyword "KEY-A" is defined in the attribute of the circuit design data of electronic part ECU-A. Further, it is assumed that the keyword "KEY-F" is defined in the attribute of the circuit design data of electronic part ECU-B. These keywords are defined in the attribute of the circuit design data, in advance so that it is not necessary to newly set a definition in the attribute of the circuit design data in order to perform the processings according to the embodiment.

The electronic part document processing unit 22 specifies circuit design data of an electronic part which controls a machine part, among the acquired circuit design data (step S13). For example, the electronic part document processing unit 22 may specify the circuit design data of an electronic part which controls a machine part, based on a keyword which is defined in the attribute of the circuit design data.

In the embodiment, it is assumed that the keywords "KEY-A" and "KEY-F" are considered as circuit design data of electronic parts which control a machine part. The electronic part document processing unit 22 determines whether there is circuit design data specified in step S13 (step S14).

When it is determined as NO in step S14, the electronic part document processing unit 22 does not store information in the database 13. Meanwhile, when it is determined as YES in step S14, the electronic part document processing unit 22 stores the information specifying the circuit design data and a keyword in the database 13 to be associated with each other in step S15.

In the foregoing, the electronic part document processing unit 22 stores "KEY-A" and information specifying circuit design data of electronic part ECU-A in the database 13 to be associated with each other. Further, the electronic part document processing unit 22 stores "KEY-F" and information specifying circuit design data of electronic part ECU-B in the database 13 to be associated with each other.

The electronic part document processing unit 22 performs a loop processing of steps S17 and S18 by the circuit design data specified in step S13 (step S16). The electronic part document processing unit 22 determines whether there is circuit design data having a relevance with circuit design data specified by the electronic part document processing unit 22 in step S13 (step S27).

For example, when there is an electrical connection between electronic parts which are implemented by circuit design data, the electronic part document processing unit 22 determines that the circuit design data is related with each other. When it is determined as YES in step S27, the electronic part document processing unit 22 sets a relationship between the circuit design data (step S17).

Mean, when it is determined as NO in step S27, the electronic part document processing unit 22 does not set a relationship between the circuit design data. According to the embodiment, it is assumed that there is no electrical connection between electronic part ECU-A and electronic part ECU-B. Therefore, no relationship is set to the circuit design data of the electronic parts.

When the processings of steps S17 and S18 on all circuit design data specified in step S3 is terminated, the loop processing which has started from step S16 is terminated in step S19.

An example of a processing on the machine part document will be described with reference to FIG. 6. The design document management supporting unit 10 accesses the machine part document management computer 4 through the communication unit 11 and the LAN 6 to acquire all CAD data which are stored in the machine part document management computer 4 (step S21).

The machine part document processing unit 23 specifies a model of a machine part having a relevance with other machinery part, based on the acquired CAD data (step S22). For example, when the acquired machine part of the model is in contact with, adjacent to, fitted to, or assembled with the other machine part, the machine part document processing unit 23 specifies that there is a relevance between the machine parts.

Further, the machine part document processing unit 23 specifies that two machine parts having the same hole feature have relevance. Further, when a plurality of machine parts is operated in cooperation with each other (kinematics), the machine part document processing unit 23 specifies that the plurality of machine parts have relevance.

According to the embodiment, it is assumed that two machine parts of model A and model C have the relevance in kinematics in that the machine parts are operated in cooperation with each other. Further, it is assumed that a machinery part of model D has relevance in that the machine part of model D is assembled to a machinery part of model E. Further, it is assumed that a machine part of model E and a machine part of model F have interference relevance. In the meantime, it is assumed that a machine part of model B exists as a single body so that the machine part of model B does not have a relevance with other machine parts.

The machine part document processing unit 23 extracts a keyword from an attribute of a model specified in step S22, in step S23. According to the embodiment, "KEY-A" is defined in an attribute of the model A. "KEY-B" is defined in an attribute of the model B. "KEY-C" is defined in the attribute of model C.

"KEY-D" is defined in an attribute of model D. "KEY-E" is defined in the attribute of model E. "KEY-F" is defined in the attribute of model F. These keywords are defined in the attribute of the CAD data in advance so that it is not necessary to newly set a definition in the attribute of the CAD data in order to perform the processing according to the embodiment.

The machine part document processing unit 23 stores the information specifying the model extracted in step S23 and a keyword in the database 13 to be associated with each other (step S24). According to the embodiment, the machine document processing unit 23 stores information specifying model A and a keyword "KEY-A" in the database 13 to be associated with each other. Further, the machine document processing unit 23 stores information specifying model B and the keyword "KEY-B" in the database 13 so as to be associated with each other.

Further, the machine part document processing unit 23 stores information specifying model C and the keyword "KEY-C" in the database 13 to be associated with each other. Further, the machine document processing unit 23 stores information specifying model D and the keyword "KEY-D" in the database 13 to be associated with each other.

Further, the machine document processing unit 23 stores information specifying model E and the keyword "KEY-E" in the database 13 to be associated with each other. Further, the machine document processing unit 23 stores information specifying model F and the keyword "KEY-F" in the database 13 to be associated with each other.

The machine part document processing unit 23 performs a loop processing of steps S26 and S27 by the CAD data specified in step S22 (step S25). The machine part document processing unit 23 determines whether there are models having relevance, among the models specified in step S22 (step S26).

The relevance of models includes, for example, contact, assembly, welding, and kinematics, as described above. When it is determined as YES in step S26, the machine part document processing unit 23 sets a relationship to the CAD data having a relevance (step S27).

According to the embodiment, model A and model C have a relevance in kinematics. Accordingly, the machine part document processing unit 23 sets a relationship between model A and model C. In the attributes of the models to which the relationship is set, which a relevance exists between the models is defined, Accordingly, the machine part document processing unit 23 may recognize that a relationship in kinematics is set between model A and model C.

Model D and model E have an assembly relevance. Accordingly, the machine part document processing unit 23 sets an assembly relationship between the model D and the model E. Model E and model F have an interference relevance. Accordingly, the machine part document processing unit 23 sets an interference relationship between the model E and the model F.

In the meantime, when a machine part of the CAD data which is specified in step S22 does not have a relevance with other machinery part (NO in step S26), the machine part document processing unit 23 does not set a relation.

When the processings of steps S26 and S27 on all the CAD data specified in step S22 is terminated, the loop processing which has started from step S25 is terminated in step S28.

Next, a processing of specifying a relevance between document data will be described. The inter-document relevance specifying unit 24 specifies a relevance between different kinds of document data. The inter-document relevance specifying unit 24 extracts a function which controls an electronic part or a machine part which is specified by the program document processing unit 21 (step S31).

The extraction processing is performed to exclude document data which does not have relevance among different kinds of document data. The processing performed in step S3 of FIG. 4 is a processing which extracts a function which controls an electronic part or a machine part. Therefore, when the function which controls an electronic part or a machine part is not included in the source code, there is no relevance between different kinds of document data.

Further, the function which controls the electronic part or the machine part has already been specified in step S3 of FIG. 4. Therefore, it is narrowed down to the document data which is likely to have relevance, among the different kinds of document data, using the processing which has been already performed, so as to specify relevance. Therefore, the speed-up of processings may be facilitated.

Further, the inter-document relevance specifying unit 24 acquires the result of step S3 of FIG. 4 from the program document processing unit 21. Therefore, the inter-document relevance specifying unit 24 does not need to newly perform a processing of extracting a function which controls an electronic part or a machine part.

Next, the inter-document relevance specifying unit 24 starts a loop processing on all the source codes which include the extracted function in step S32. The inter-document relevance specifying unit 24 searches for a keyword which is associated with the circuit design data stored in the database 13 (step S33).

As described above, information specifying circuit design data of electronic part ECU-A and the keyword "KEY-A" are stored in the database 13 to be associated with each other. Further, information specifying circuit design data of electronic part ECU-F and the keyword "KEY-F" are stored in the database 13 to be associated with each other.

The inter-document relevance specifying unit 24 recognizes "KEY-A" and "KEY-F" as keywords. The inter-document relevance specifying unit 24 acquires a source code which includes a function specified in step S31, among the source codes stored in the database 13, and a keyword which is associated with the source code.

According to the embodiment, source codes A to F include a function which controls an electronic part or a machine part. The inter-document relevance specifying unit 24 determines whether source codes A to F and the circuit design data have the same keyword in step S33.

The keyword of source code A is "KEY-A", which is the same as the keyword "KEY-A" of the circuit design data of electronic part ECU-A. Therefore, since the keywords are the same (YES in step S34), the inter-document relevance specifying unit 24 specifies that there is relevance between source code A and electronic part ECU-A. Therefore, the relationship setting unit 25 sets a relationship between source code A and electronic part ECU-A (step S35).

The keyword of source code F is "KEY-F", which is the same as the keyword "KEY-F" of the circuit design data of electronic part ECU-F. Therefore, the inter-document relevance specifying unit 24 specifies that there is relevance between source code F and electronic part ECU-F. Accordingly, the relationship setting unit 25 sets a relationship between source code F and electronic part ECU-F.

Next, the inter-document relevance specifying unit 24 searches for a model which is stored in the database 13 in step S36. In the database 13, models A to F and "KEY-A" to "KEY-F" are stored to be associated with each other.

The inter-document relevance specifying unit 24 determines whether the source code including the function extracted in step S31 has the same keyword as the keyword of the searched model in step S37. When the source code has the same keyword (YES in step S37), the inter-document relevance specifying unit 24 specifies that the source code and the model have relevance. The relationship setting unit 25 sets a relationship between the source code specified by the inter-document relevance specifying unit 24 and the model in step S28. When there is no the same keyword (NO in step S37), no relationship is set.

According to the embodiment, the keyword of source code A is "KEY-A" and the keyword of model A is "KEY-A". Therefore, the relationship setting unit 25 sets a relationship between source code A and model A. As described above, the relationship is set between the source code A and electronic part ECU-A. Therefore, a relationship is set among three parties of source code A, electronic part ECU-A, and model A.

Further, the keyword of source code B is "KEY-B" and the keyword of model B is "KEY-B". Therefore, the relationship setting unit 25 sets a relationship between source code B and model B.

Further, the keyword of source code C is "KEY-C" and the keyword of model C is "KEY-C". Therefore, the relationship setting unit 25 sets a relationship between source code C and model C.

Further, the keyword of source code D is "KEY-C" and the keyword of model C is "KEY-C". Therefore, the relationship setting unit 25 sets a relationship between source code D and model C. In the meantime, a relationship is also set between source code C.

Further, the keyword of source code E is "KEY-B" and the keyword of model B is "KEY-B". Therefore, the relationship setting unit 25 sets a relationship between source code E and model B. In the meantime, a relationship is also set between model B and source code B.

Further, the keyword of source code F is "KEY-F" and the keyword of model F is "KEY-F". Therefore, the relationship setting unit 25 sets a relationship between source code F and model F. In the meantime, as described above, a relationship is also set between source code F and electronic part ECU-F. Therefore, a relationship is set among three parties of source code F, electronic part ECU-F, and model F.

Accordingly, a relationship is set between the different kinds of document data. Further, a relationship is set between the same kind of document data in step S8 of FIG. 4, step S18 of FIG. 5, and step S27 of FIG. 6. As a result, a relationship may be set between different kinds of document data and between the same kind of document data.

<Exemplary Screen Transition>

Figure 8:
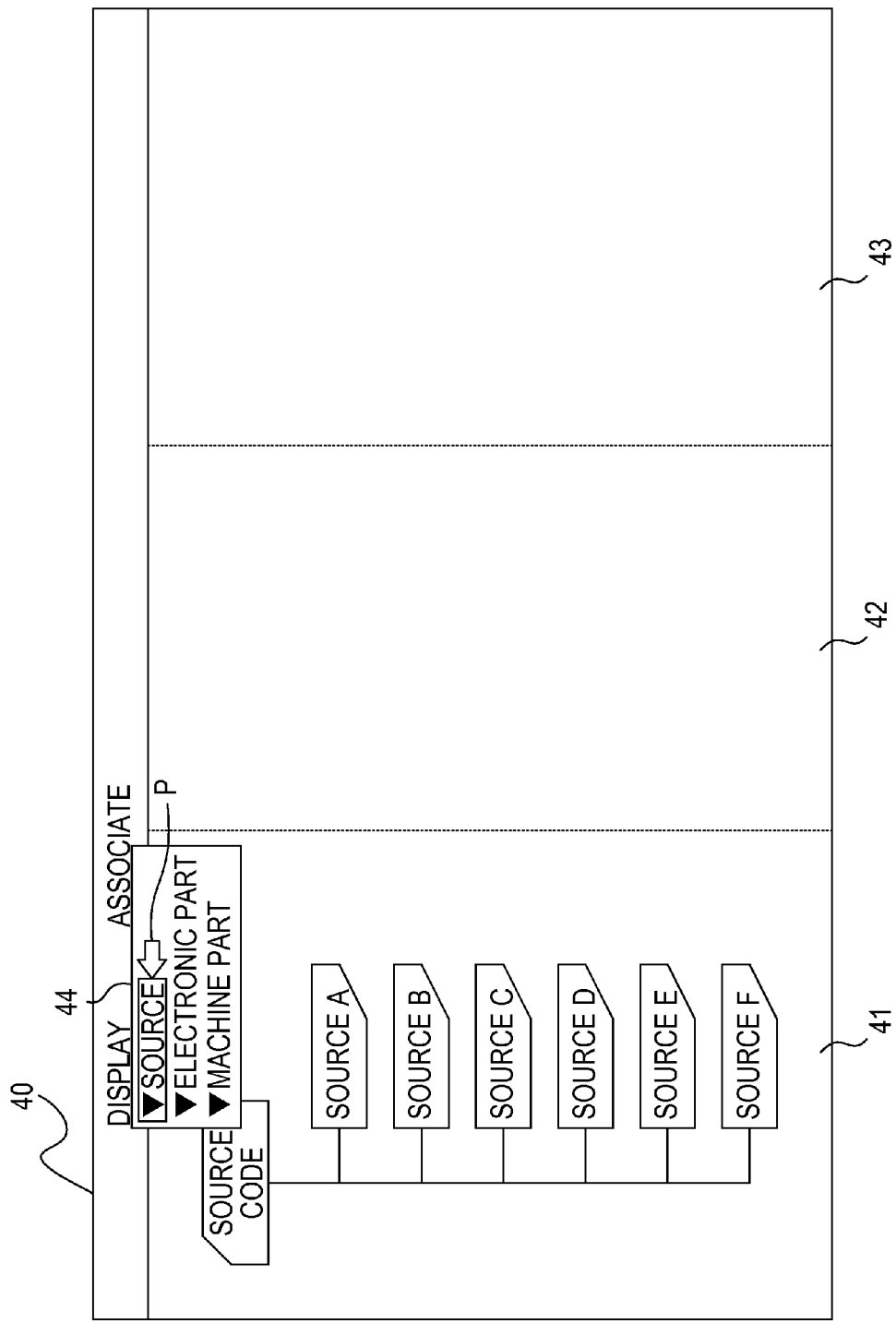
FIG. 8 is a first exemplary screen which is displayed on a display unit.

Next, an exemplary screen displayed on a display unit 12 will be described. FIG. 8 is an exemplary screen displayed on a display unit 12. A screen 40 has a first display region 41 which displays information on a program document, a second display region 42 which displays information on an electronic part document, and a third display region 43 which displays information on a machine part document.

In the example of FIG. 8, an operator who operates a design document management supporting computer 5 may operate a pointer P using an input device (for example, a mouse). As an example, the operator selects "display" using the mouse, so that the first menu 44 is displayed.

In the first menu 44, "SOURCE", "ELECTRONIC PART", and "MACHINE PART" are displayed. When "SOURCE" is selected, information on a source code is displayed in the first display region 41. According to the embodiment, there are six source codes of source codes A to F. Therefore, information indicating the six source codes (from "SOURCE A" to "SOURCE F" of FIG. 8) is displayed in the first display region 41.

Figure 9:
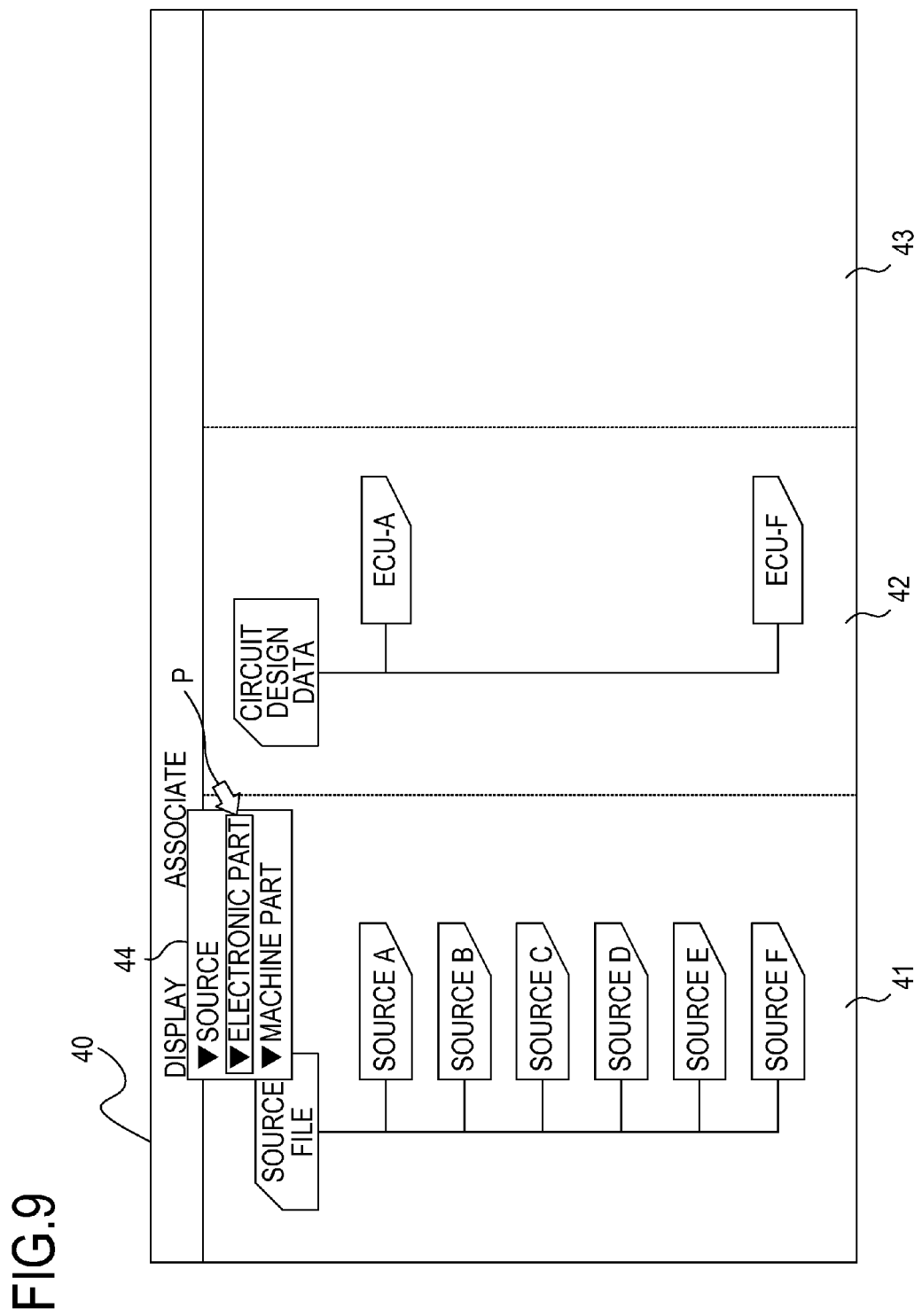
FIG. 9 is a second exemplary screen which is displayed on a display unit.

In the example of FIG. 9, the operator selects "ELECTRONIC PART" using the mouse. Therefore, information on an electronic part is displayed in the second display region 42. According to the embodiment, since there are two circuit design data of electronic part ECU-A and electronic part ECU-F, information indicating two circuit design data ("ECU-A" and "ECU-F" of FIG. 9) is displayed.

Figure 10:
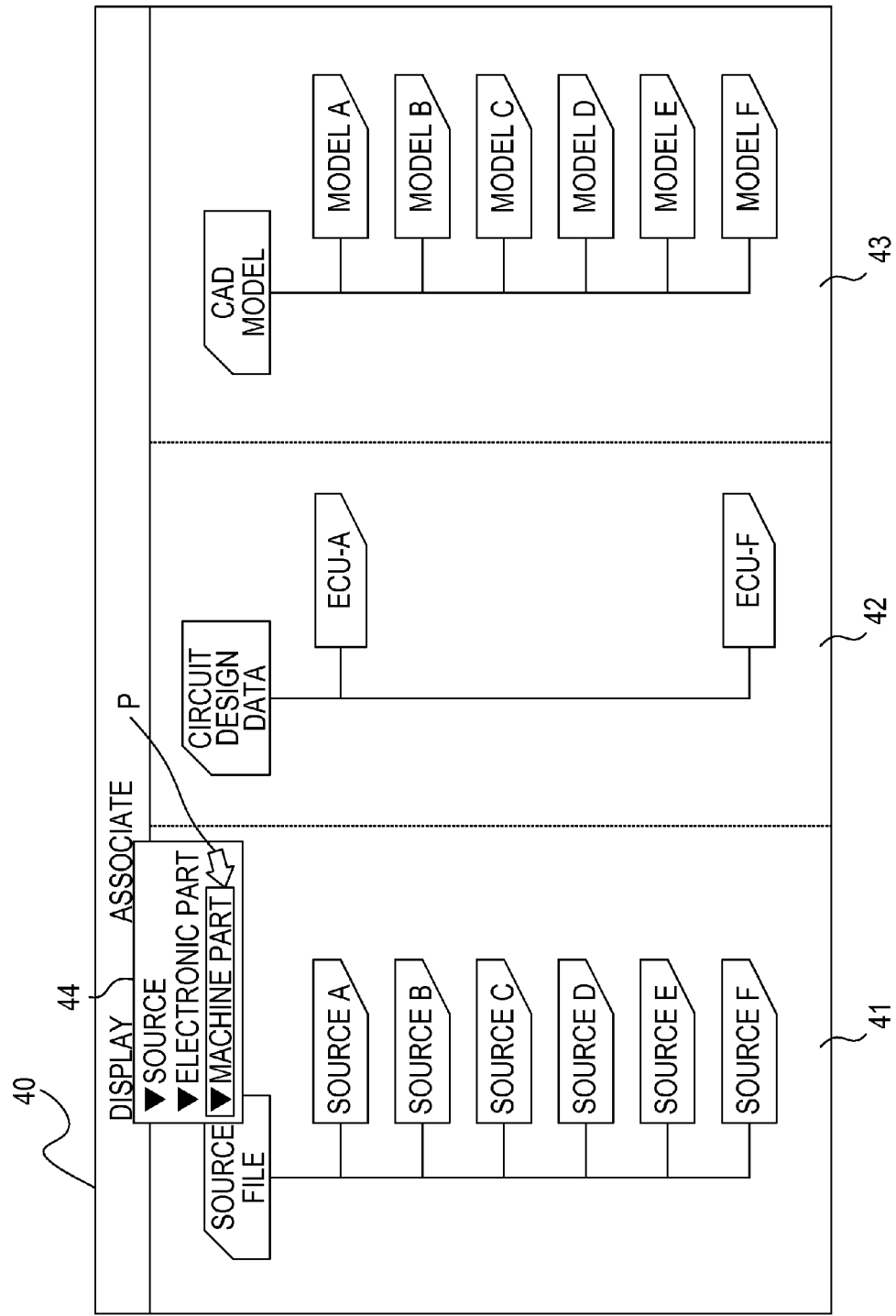
FIG. 10 is a third exemplary screen which is displayed on a display unit.

In the example of FIG. 10, the operator selects "MACHINE PART" using the mouse. Therefore, information on a machine part is displayed in the third display region 43. According to the embodiment, since there are six models of models A to F, information indicating six models (from "MODEL A" to "MODEL F") is displayed.

Figure 11:
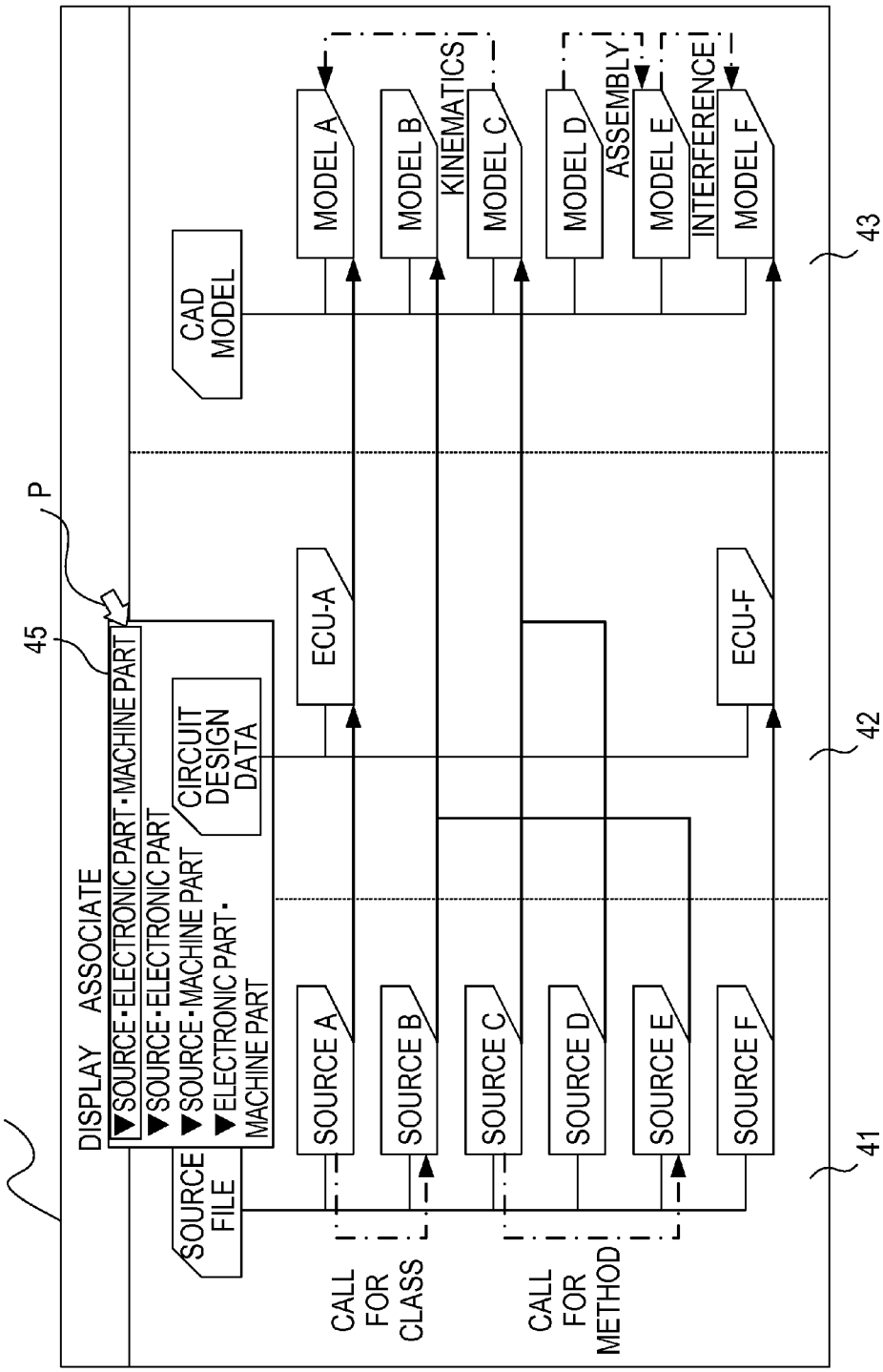
FIG. 11 is a fourth exemplary screen which is displayed on a display unit.

In the example of FIG. 11, the operator selects "associate" using the mouse. Therefore, the second menu 45 is displayed. Four information items are displayed in the second menu 45. "SOURCE·ELECTRONIC PART·MACHINE PART" is a menu for displaying a relationship among a source code, an electronic part document, and a machine part document.

"SOURCE·ELECTRONIC PART" is a menu for displaying a relationship between a source code and an electronic part document. "SOURCE·MACHINE PART" is a menu for displaying a relationship between a source code and a machine part document. "ELECTRONIC PART·MACHINE PART" are a menu for displaying a relationship between an electronic part document and a machine part document.

A relation between different kinds of document data and a relationship between the same kind of document data are set by the above-described processings. Therefore, based on these relations, the display unit 12 displays relations on the screen 40. In the example of FIG. 11, relations between the document data of the different kinds are represented by solid-line arrows and relations between the same kind of document data are represented by one-dot chain line arrows.

The aspect of displaying the relations is not limited to the example of FIG. 11. However, in the point of view of visibility, an aspect of displaying a relationship between the same kind of document data and an aspect of displaying a relationship between different kinds of document data may be different from each other.

As described above, a relationship between document data is specified in terms of kind. Therefore, in the example of FIG. 11, the display unit displays information indicating kinds of relations together with the relations. For example, "CALL FOR CLASS" and "CALL FOR METHOD" represent a relationship between the same kind of source codes. Further, "KINEMATICS", "ASSEMBLY", and "INTERFERENCE" represent a relationship between the same kind of models.

Therefore, the operator may easily recognize the relations between the different kinds of document data and the relations between the same kind of document data by visually recognizing the screen 40. Accordingly, a range which may be affected by a change caused in any document data may be easily recognized.

For example, when a change is caused in source code D, the operator may recognize that model C will be affected by the change, based on the screen 40. Further, since model C is set to have a relationship with the model A, the operator may recognize that the model A will be affected by the change of the source code D.

Accordingly, even if document data of machine parts, electronic parts, and programs are managed by different systems, document data to be affected by a change caused in any document data may be easily recognized. Therefore, the management of design documents may be supported.

Here, a relationship of each document data may be stored for every version where a change is caused in any one of documents. When a change is caused in any one of document data, a relationship after the change and a relationship before the change may be different from each other. For example, when a source code is changed, a source code which has controlled another machine part before the change may not control the machine part after the change.

In this case, the version of the relationship before change and the version of the relationship after change may be separately stored. Therefore, how a change of document data influences a relationship may be verified.

<Exemplary Relationship Between Program Document and Machine Part Document>

Next, an exemplary relationship between a program document and a machinery part document will be described. When a source code controls a model, a relationship between a program document and a machine part document may be displayed. In this case, information on an electronic part may not be displayed.

As described above, the program document is managed by the program document management computer 2 and the machine part document is managed by the machine part document management computer 4. Accordingly, the program document and the machine part document are managed by different systems. Therefore, when a change is caused in any of the program document and the machine part document, it is not easy to verify which one of the different kinds of document data is affected by the change.

Figure 12:
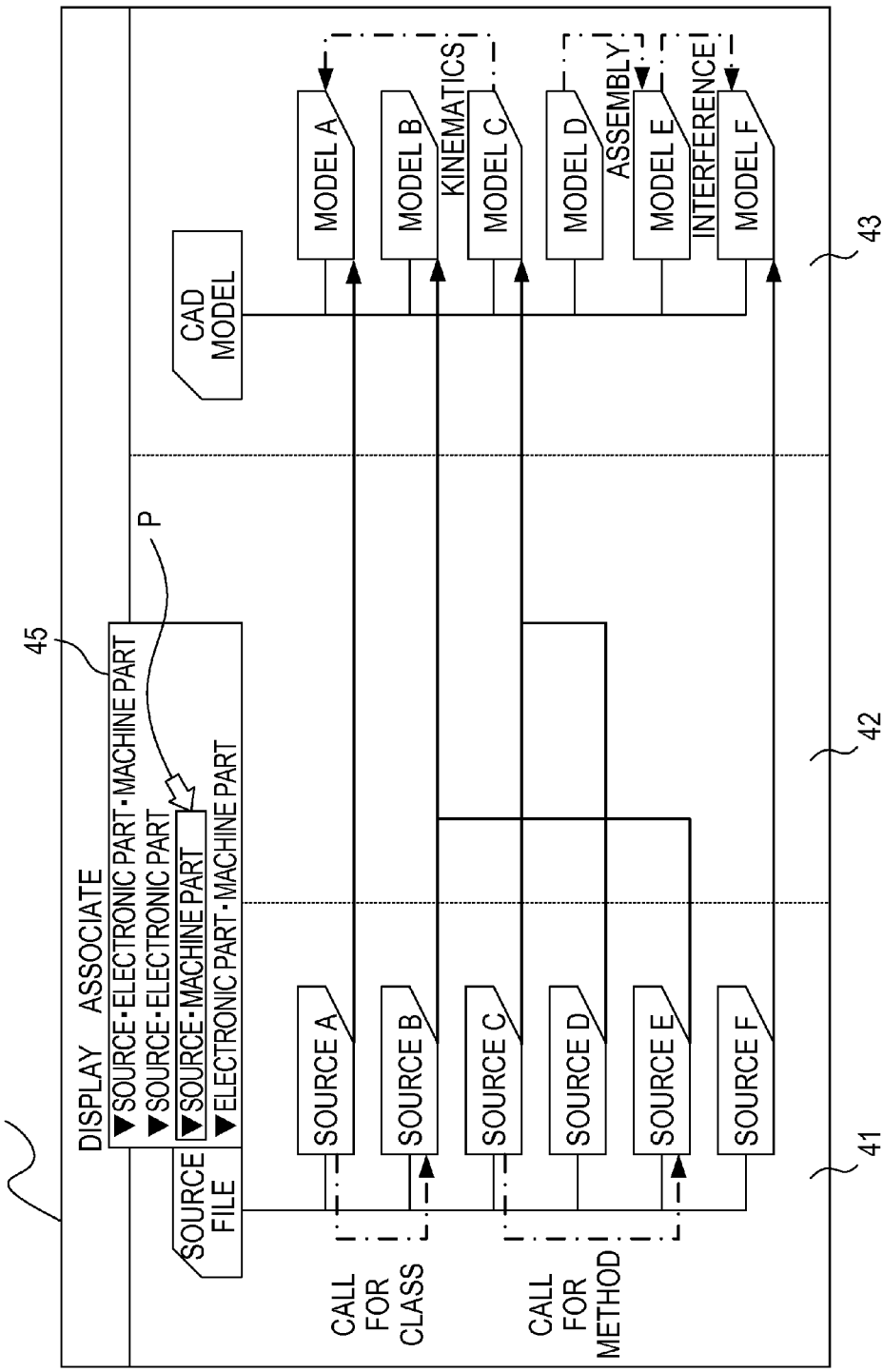
FIG. 12 is a fifth exemplary screen which is displayed on a display unit.

Therefore, a relationship may be set between the program document and the machine part document. FIG. 12 is an exemplary screen which displays a relationship between a source code and a model. The operator selects "SOURCE·MACHINE PART" from the second menu of the screen 40.

Therefore, relations between source codes and models are displayed on the screen. Further, information on an electronic part is not displayed in the second display region 42. Even if the information on an electronic part may be displayed in the second region 42, the information on the electronic part may not be displayed in the point of view of visibility.

On the screen 40 illustrated in FIG. 12 as an example, it is displayed that a relationship is set between source code A and model A. Further, it is displayed that a relationship is set among source code B, source code E and model B. Further, it is displayed that a relationship is set among source code C, source code D, and model C.

Further, it is displayed that a relationship is set between source code F and model F. Since model D and model E are not associated with a source code, no relationship is set therebetween.

For example, when a change is caused in source code E, the operator may recognize that the model C is affected by the change by visibly recognizing the screen 40. Further, a relationship between the same kind of document data is displayed as it is. Therefore, the operator may recognize that the change of source E influences model A which has a kinematics relationship with model C.

As described above, by visibly recognizing the screen 40 illustrated in FIG. 12 as an example relevance between a program document and machine part document may be easily recognized. Therefore, the management of design documents may be supported.

Further, when the operator selects "SOURCE-ELECTRONIC PART" from the second menu 45, relations between program documents and electronic part documents are displayed on the screen 40. Further, when the operator selects "ELECTRONIC PART-MACHINE PART" from the second menu 45, a relations between electronic part documents and machine part documents are displayed on the screen 40.

Therefore, when the second menu 45 is displayed, a relationship between arbitrary two kinds of document data may be selectively displayed. Further, relations among three kinds of document data may be selectively displayed when "SOURCE-ELECTRONIC PART-MACHINE PART" in the second menu 45 is displayed.

<Exemplary Hardware Configuration of Design Document Management Supporting Computer>

Figure 13:
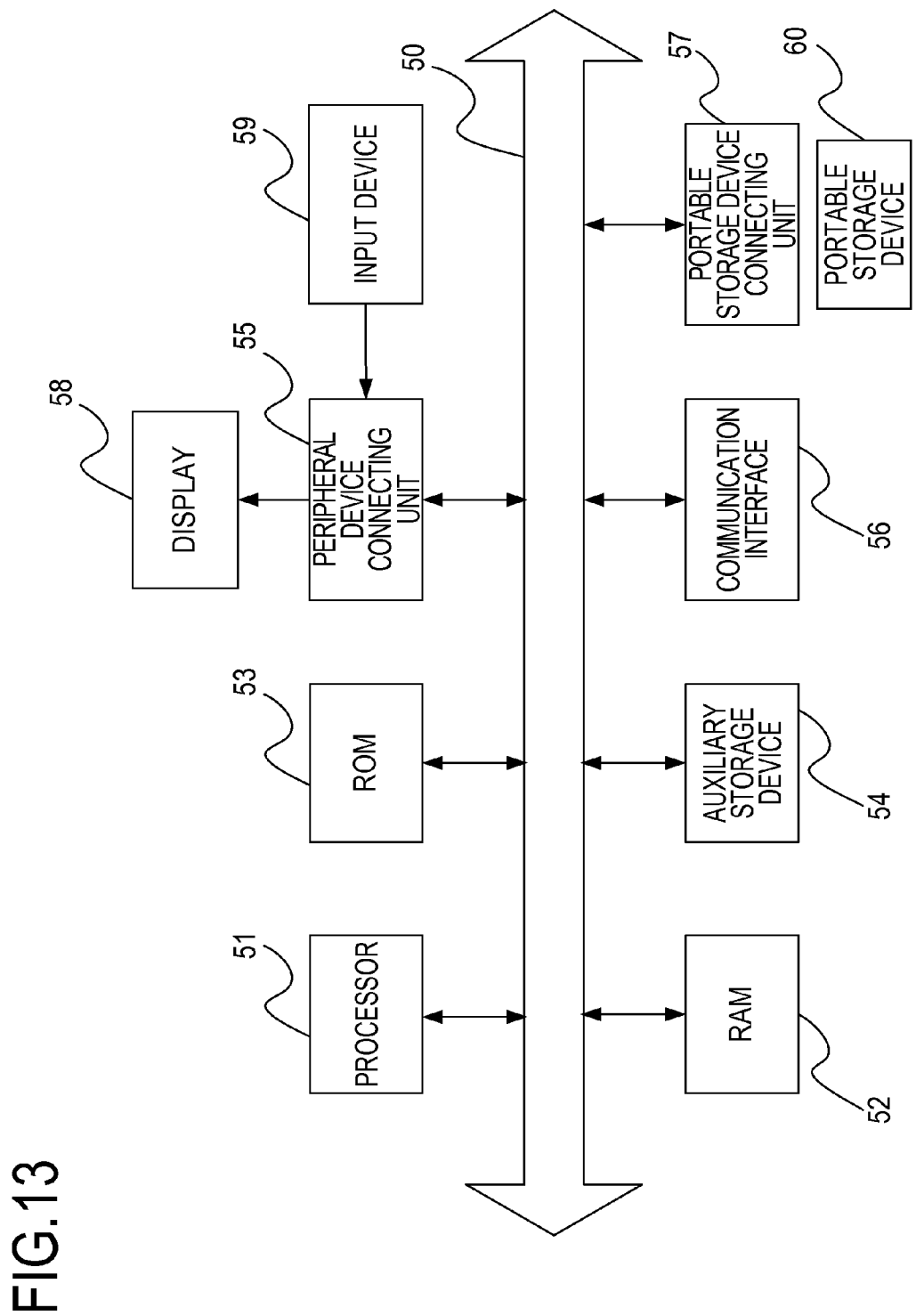
FIG. 13 is a view illustrating an exemplary hardware configuration of a design document management supporting apparatus.

Next, an exemplary hardware configuration of a design document management supporting computer 5 will be described. As illustrated in an example of FIG. 13, a processor 51, a random access memory (RAM) 52, a read only memory (ROM) 53, an auxiliary storage device 54, a peripheral device connecting unit 55, a communication interface 56, and a portable storage device connecting unit 57 are connected to a bus 50.

The processor 51 is an arbitrary processing circuit such as, for example, a central processing unit (CPU). The processor 51 executes a program which is developed in the RAM 52. The ROM 53 is a non-volatile storage device in which a program to be developed in the RAM 52 is stored.

The auxiliary storage device 54 is a storage device in which various information items are stored and for example, a hard disk driver or a semiconductor memory may be applied to the auxiliary storage device 54. The relationship for every version described above may be stored in the auxiliary storage device 54. The peripheral device connecting unit 55 connects the display 58 and the input device 59.

The portable storage device connecting unit 57 may be provided to be connected with a portable storage device 60. A portable memory or an optical disk (for example, a compact disk (CD) or a digital video disk (DVD)) may be applied as the portable storage device 60. A program which performs the processings of the embodiment may be recorded in a computer readable recording medium. In this case, the portable storage device 60 may be applied as the recording medium.

The RAM 52, the ROM 53, and the auxiliary storage device 54 are examples of the computer readable storage medium. These types of storage mediums are not a transitory medium such as a signal carrier wave.

A function of each unit of the design document management supporting unit 10 illustrated in FIG. 3 may be implemented by a program which may be executed by the processor 51. A function of the communication unit 11 may be implemented by the communication interface 56. A function of the display unit 12 may be implemented by the display 58. The database 13 may be stored in the auxiliary storage device 54. The above-described mouse may be implemented by the input device 59.

Although embodiments disclosed and advantages thereof have been described in detail, various changes, addition, or omission may be made by those skilled in the art without departing from the scope of the present disclosure which is clearly described in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the design document relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process, the process comprising:
   specifying a first relevance between machine parts by processing machine part documents which include design information of the machine parts, the first relevance being specified when there is one or more of a contact, assembly, welding, and kinematics relationship between two or more of the machine parts, and extracting a keyword of each of the machine part documents, each machine part document including design information of a machine part that has the first relevance;
   specifying a second relevance between electronic parts by processing electronic part documents which include design information of the electronic parts which control the machine parts, the second relevance being specified when there is an electrical connection between two or more of the electronic parts, and extracting a keyword of each of the electronic part documents, each electronic part document including design information of an electronic part that has the second relevance;
   specifying a third relevance between source codes by processing program documents which include the source codes for causing the electronic parts or the machine parts to perform a processing, the third relevance being specified when a function is included in a source code and the function is called in another source code, and extracting a keyword of each of the program documents, each program document including a source code that has the third relevance;
   associating documents having a common keyword among the extracted keywords of the program documents, the electronic part documents, and the machine part documents so that the program documents, the electronic part documents, and the machine part documents are associated with each other, respectively; and
   displaying a screen on which a visualized relationship among the program documents, the electronic part documents, and the machine part documents which are associated is set.

2. The non-transitory, computer-readable recording medium according to claim 1, wherein the process further comprises:
   when associating the program documents with either the electronic part documents or the machine part documents, excluding a program document of a program which does not control the machine parts or the electronic parts from the program documents.

3. The non-transitory, computer-readable recording medium according to claim 1, wherein the process further comprises:
displaying a relationship between different kinds of documents and a relationship between the same kind of documents, among each of the program documents, each of the electronic part documents, and each of the machine part documents, in different displaying aspects.

4. The non-transitory, computer-readable recording medium according to claim 1, wherein the process further comprises:
displaying a menu for selecting a relationship between two kinds of arbitrary documents or a relationship between three kinds of documents, among each of the program documents, each of the electronic part documents, and each of the machine part documents.

5. The non-transitory, computer-readable recording medium according to claim 1, wherein the process further comprises:
storing a relationship whenever a change is caused in any one document among each of the program documents, each of the electronic part documents, and each of the machine part documents.

6. The non-transitory, computer-readable recording medium according to claim 1, wherein the program documents are source codes and the process further comprising:
specifying the relevance between the program documents when a function included in one source code calls for another source code.

7. The non-transitory, computer-readable recording medium according to claim 1, wherein the process further comprises:
specifying the first relevance between the machine parts when one of the machine parts operates in association with another machine part.

8. The non-transitory, computer-readable recording medium according to claim 1, wherein the process further comprises:
specifying the first relevance between the machine parts when one of the machine parts is a member having a screw hole and another machine part is a screw, and hole features of the screw hole and the screw coincide with each other.

9. The non-transitory, computer-readable recording medium according to claim 1, wherein the process further comprises:
displaying information representing a document of the visualized relationship.

10. A method of supporting a design document management, the method comprises:
specifying, by a computer, a first relevance between machine parts by processing machine part documents which include design information of the machine parts, the first relevance being specified when there is one or more of a contact, assembly, welding, and kinematics relationship between two or more of the machine parts, and extracting a keyword of each of the machine part documents, each machine part document including design information of a machine part that has the first relevance;
specifying, by the computer, a second relevance between electronic parts by processing electronic part documents that include design information of the electronic parts controlling the machine parts, the second relevance being specified when there is an electrical connection between two or more of the electronic parts, and extracting a keyword of each of the electronic part documents, each electronic part document including design information of an electronic part that has the second relevance;
specifying, by the computer, a third relevance between source codes by processing program documents which include the source codes for causing the electronic parts or the machine parts to perform a processing, the third relevance being specified when a function is included in a source code and the function is called in another source code, and extracting a keyword of each of the program documents, each program document including a source code that has the third relevance;
associating documents having a common keyword among the extracted keywords of the program documents, the electronic part documents, and the machine part documents so that the program documents, the electronic part documents, and the machine part documents are associated with each other, respectively; and
displaying a screen on which a visualized relationship among the program documents, the electronic part documents, and the machine part documents which are associated is set.

11. An apparatus for supporting design document management, the apparatus comprising:
a memory; and
one or more processors coupled to the memory, the one or more processors being configured to:
specify a first relevance between machine parts by processing machine part documents that include design information of the machine parts, the first relevance being specified when there is one or more of a contact, assembly, welding, and kinematics relationship between two or more of the machine parts, and extract a keyword of each of the machine part documents, each machine part document including design information of a machine part that has the first relevance;
specify a second relevance between electronic parts by processing electronic part documents which include design information of the electronic parts controlling the machine parts, the second relevance being specified when there is an electrical connection between two or more of the electronic parts, and extract a keyword of each of the electronic part documents, each electronic part document including design information of an electronic part that has the second relevance;
specify a third relevance between source codes by processing program documents which include the source codes for causing the electronic parts or the machine parts to perform a processing, the third relevance being specified when a function is included in a source code and the function is called in another source code, and extract a keyword of each of the program documents, each program document including a source code that has the third relevance;
associate documents having a common keyword among the extracted keywords of the program documents, the electronic part documents, and the machine part documents so that the program documents, the electronic part documents, and the machine part documents are associated with each other, respectively; and
display a screen on which a visualized relationship among the program documents, the electronic part documents, and the machine part documents which are associated is set.

* * * * *